(12) United States Patent
Koo et al.

(10) Patent No.: US 9,071,961 B2
(45) Date of Patent: Jun. 30, 2015

(54) METHOD FOR ESTIMATING CHANNEL STATE IN A WIRELESS COMMUNICATION SYSTEM USING FRACTIONAL FREQUENCY REUSE AND MOBILE STATION USING THE SAME

(75) Inventors: Ja Ho Koo, Gyeonggi-do (KR); Wook Bong Lee, Gyeonggi-do (KR); Su Nam Kim, Gyeonggi-do (KR); Bin Chul Ihm, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 732 days.

(21) Appl. No.: 12/793,349

(22) Filed: Jun. 3, 2010

(65) Prior Publication Data

US 2010/0311349 A1 Dec. 9, 2010

Related U.S. Application Data

(60) Provisional application No. 61/183,946, filed on Jun. 3, 2009, provisional application No. 61/218,980, filed on Jun. 21, 2009, provisional application No. 61/302,945, filed on Feb. 9, 2010.

(30) Foreign Application Priority Data

Jan. 11, 2010 (KR) .................. 10-2010-0002224

(51) Int. Cl.
H04B 17/00 (2006.01)
H04W 16/02 (2009.01)
H04W 72/08 (2009.01)

(52) U.S. Cl.
CPC ............ *H04W 16/02* (2013.01); *H04W 72/082* (2013.01)

(58) Field of Classification Search
USPC ........ 455/67.11, 450, 452.1, 452.2, 501, 509; 370/328–331, 252
See application file for complete search history.

(56) References Cited

U.S. PATENT DOCUMENTS

| 7,848,294 | B2 * | 12/2010 | Huang et al. .................. 370/331 |
| 8,537,911 | B2 * | 9/2013 | Sayana et al. ................. 375/260 |
| 2007/0076677 | A1 * | 4/2007 | Batariere et al. .............. 370/342 |
| 2007/0191051 | A1 | 8/2007 | Suonvieri |
| 2007/0281624 | A1 * | 12/2007 | Thomas et al. ............ 455/67.11 |
| 2008/0144577 | A1 * | 6/2008 | Huang et al. .................. 370/331 |
| 2008/0214198 | A1 * | 9/2008 | Chen et al. .................... 455/450 |
| 2009/0092178 | A1 * | 4/2009 | Sayana et al. ................. 375/227 |
| 2009/0117896 | A1 * | 5/2009 | Baldemair et al. ........... 455/434 |
| 2009/0245172 | A1 * | 10/2009 | Sato .............................. 370/328 |
| 2009/0245197 | A1 * | 10/2009 | Ma et al. ....................... 370/330 |
| 2009/0252110 | A1 * | 10/2009 | Sridhara et al. ............... 370/330 |

(Continued)

FOREIGN PATENT DOCUMENTS

| CN | 1998252 A | 7/2007 |
| CN | 101056156 A | 10/2007 |

(Continued)

*Primary Examiner* — Nay A Maung
*Assistant Examiner* — Erica Fleming-Hall
(74) *Attorney, Agent, or Firm* — McKenna Long Aldridge LLP

(57) ABSTRACT

A method for estimating channel state in a wireless communication system and a mobile station using the same are disclosed. The method includes acquiring cell Identifiers (IDs) of a serving cell and one or more neighbor cells, acquiring information about preset power level patterns for one or more frequency partitions to which FFR is applied according to the cell IDs, and estimating a channel state of the serving cell based on the power level pattern information.

10 Claims, 8 Drawing Sheets

(56) References Cited

U.S. PATENT DOCUMENTS

| | | |
|---|---|---|
| 2009/0252143 A1* | 10/2009 | Sridhara et al. ............... 370/345 |
| 2009/0264142 A1* | 10/2009 | Sankar et al. ................. 455/501 |
| 2010/0034146 A1* | 2/2010 | Hou et al. ..................... 370/328 |
| 2010/0035600 A1* | 2/2010 | Hou et al. ................... 455/422.1 |
| 2010/0103906 A1* | 4/2010 | Montojo et al. ............. 370/335 |
| 2010/0105406 A1* | 4/2010 | Luo et al. ................... 455/452.2 |
| 2010/0208608 A1* | 8/2010 | Wang ........................... 370/252 |
| 2010/0248728 A1* | 9/2010 | Sun et al. ..................... 455/450 |
| 2011/0003598 A1* | 1/2011 | Ma et al. ..................... 455/452.1 |
| 2011/0070911 A1* | 3/2011 | Zhang et al. ................. 455/509 |
| 2011/0116410 A1* | 5/2011 | Sung et al. ................... 370/252 |
| 2011/0190017 A1* | 8/2011 | Kwon et al. .................. 455/509 |
| 2011/0230219 A1* | 9/2011 | Shores et al. ................. 455/507 |
| 2011/0286349 A1* | 11/2011 | Tee et al. ...................... 370/252 |
| 2012/0028664 A1* | 2/2012 | Zhang et al. ................. 455/501 |
| 2012/0320882 A1* | 12/2012 | Sankar et al. ................. 370/336 |

FOREIGN PATENT DOCUMENTS

| | | |
|---|---|---|
| CN | 101406085 A | 4/2009 |
| EP | 1998582 A1 | 12/2008 |
| JP | 2007258844 A | 10/2007 |
| JP | 2007533256 A | 11/2007 |
| WO | 2008/055132 A2 | 5/2008 |

* cited by examiner

METHOD FOR ESTIMATING CHANNEL STATE IN A WIRELESS COMMUNICATION SYSTEM USING FRACTIONAL FREQUENCY REUSE AND MOBILE STATION USING THE SAME

Pursuant to 35 U.S.C. §119(e), this application claims the benefit of priority to Provisional Application No. 61/183,946, filed on Jun. 3, 2009, Provisional Application No. 61/218,980, filed on Jun. 21, 2009, Provisional Application No. 61/302,945, filed on Feb. 9, 2010, the contents of which are incorporated by reference herein in their entirety.

Pursuant to 35 U.S.C. §119(e), this application claims the benefit of priority to Korean application No. 10-2010-0002224, filed on Jan. 11, 2010

BACKGROUND OF THE INVENTION

1. Field of the Invention

The present invention relates to a wireless communication system, and more particularly, to a method for estimating channel state in a wireless communication system using Fractional Frequency Reuse (FFR).

2. Discussion of the Related Art

FFR is one of techniques that can increase the number of channels per unit area in a cellular system. Typically, a signal gets weaker as it propagates. This means that the same frequency channel can be used at places apart from each other by a certain distance or more. Relying on the principle, subscriber capacity may be increased significantly by simultaneously using the same frequency at a plurality of locations. This efficient frequency use is called frequency reuse.

A cell (or sector) is defined as a geographically distinguished unit area and frequency channel switching between cells to continue on-going communication is called handoff. Frequency reuse is essential to analog cellular mobile communication. A frequency reuse factor is one of parameters that represent frequency efficiency in a cellular system. In a multi-cell environment, the frequency reuse factor is the value of dividing the total number of cells (sectors) using the same frequency simultaneously by the total number of cells.

A first-generation (1G) system (e.g. Advanced Mobile Phone Service (AMPS)) has a frequency reuse factor less than 1. For example, the frequency reuse factor is $1/7$ in 7-cell frequency reuse. The frequency reuse factor is higher in a second-generation (2G) system (e.g. Code Division Multiple Access (CDMA) and Time Division Multiple Access (TDMA)). For instance, Global System for Mobile communications (GSM) being Frequency Division Multiple Access (FDMA) and TDMA in combination boasts a frequency reuse factor of up to $1/4$ or $1/3$. A 2G CDMA or $3^{rd}$ generation (3G) Wideband CDMA (WCDMA) system may support a frequency reuse factor of 1, thus increasing spectral efficiency and reducing network deployment cost.

The frequency reuse factor of 1 can be achieved when all sectors within a cell and all cells within a network operate on the same frequency channel. Nonetheless, even a system with the frequency reuse factor of 1 may suffer from poor throughput at a cell edge or sector edge due to severe interference between neighbor cells and thus may face service outage. That is, signal reception performance is poor for users at a cell edge because of inter-cell interference.

In Orthogonal Frequency Division Multiple Access (OFDMA), a channel is divided into subchannels and a signal is transmitted on subchannels. Unlike 3G (CDMA2000 or WCDMA), an entire channel is not occupied for signal transmission. Throughput may be increased at the same time for users at a cell center and users at a cell edge by taking advantage of this feature.

To be more specific, a cell center is an area close to a Base Station (BS) that is relatively immune to co-channel interference. Thus users at the cell center may operate on all available subchannels. On the other hand, users at a cell edge are only allowed to operate on a fraction of all available subchannels. This fraction of sub-channels is allocated in such a way that neighbor cells' edges will operate on different sets of sub-channels. This is called FFR. The co-channel interference between neighbor cells can be mitigated by orthogonally dividing entire subcarriers into a plurality of Frequency Partitions (FPs) and deploying the FAs such that each cell does not use a certain FA or uses the certain FA at a low power level.

Multiple Input Multiple Output (MIMO) has recently attracted much attention as a broadband wireless mobile communication technology. A MIMO system seeks to increase data communication efficiency by use of a plurality of antennas. Depending on whether the same data or different data are transmitted through antennas, MIMO techniques are classified into spatial multiplexing and spatial diversity.

Spatial multiplexing is characterized in that different data are transmitted simultaneously through a plurality of Transmission (Tx) antennas. Therefore, data can be transmitted at a high rate without increasing a system bandwidth. In spatial diversity, the same data is transmitted through a plurality of Tx antennas, thus achieving transmit diversity. Space time channel coding is a kind of spatial diversity scheme.

Depending on whether a receiver feeds back channel information to a transmitter, MIMO techniques are also categorized into open-loop MIMO and closed-loop MIMO. Open-loop MIMO schemes include Bell Labs Layered Space-Time (BLAST) and Space-Time Trellis Coding (STTC). According to BLAST, the transmitter transmits information in parallel and the receiver detects signals by repeating Zero Forcing (ZF) or Minimum Mean Square Error (MMSE) detection. Thus as much information as the number of Tx antennas can be transmitted. STTC achieves transmit diversity and coding gain by utilizing space. Transmit Antenna Array (TxAA) is a closed-loop MIMO technique.

In a wireless channel environment, channel state changes irregularly in time and frequency, that is, fading is inevitable. Accordingly, a receiver corrects a received signal using channel information in order to recover data transmitted by a transmitter and detect the correct data. The transmitter transmits a signal known to both the transmitter and the receiver to the receiver so that the receiver acquires channel information based on signal distortion created during transmission. The signal is a reference signal or a pilot signal and the process of acquiring channel information is called channel estimation. The reference signal is transmitted with high power, carrying no data. If data is transmitted and received through a plurality of antennas, the receiver should know channel states between the transmission antennas and the reception antennas. Thus, a reference signal is transmitted through each transmission antenna.

Coordinated Multi-Point (CoMP) was proposed to improve the throughput of a user at a cell edge by applying advanced MIMO under a multi-cell environment. The use of CoMP in a wireless communication system may increase the communication performance of an MS at a cell edge. For this purpose, accurate channel estimation needs to be performed based on reference signals received from a plurality of BSs. Multi-cell BSs may provide joint data support to an MS by a CoMP operation. Also, each BS may improve system performance by simultaneously supporting one or more MSs MS1, MS2, . . . , MSK. Further, a BS may implement Space Division Multiple Access (SDMA) based on channel state information between the BS and MSs.

In a CoMP wireless communication system, a serving BS and one or more neighbor BSs, BS1, BS2, . . . , BSM are connected to a scheduler over a backbone network. The scheduler receives feedback channel information representing channel states between the MSs, MS1 to MSK and the BSs BS1, BS2, . . . , BSM, as measured by the BSs. For example, the scheduler may schedule cooperative MIMO information for the serving BS and the one or more cooperating BSs. That is, the scheduler issues a command related to a cooperative MIMO operation directly to each BS.

FIG. 1 conceptually illustrates a CoMP scheme applied to a wireless communication system under a multi-cell environment.

Referring to FIG. 1, there are intra enhanced Node Bs (eNBs) 110 and 120 and an inter eNB 130 in the multi-cell environment. An intra eNB covers a plurality of cells (or sectors) in a Long Term Evolution (LTE) system. Cells covered by an eNB to which a User Equipment (UE) belongs are in an intra eNB relationship with the UE. That is, cells covered by the same eNB that manages a cell in which a UE is located are intra-eNB cells, and cells covered by a different eNB from the eNB that manages the serving cell of the UE are inter-eNB cells.

Cells covered by the same eNB that serves a UE exchange information (e.g. data and Channel State Information (CSI)) through an x2 interface, while cells covered by a different eNB from the serving eNB of the UE exchange inter-cell information via a backhaul 140. As illustrated in FIG. 1, a single-cell MIMO user 150 located in a single cell (or sector) may communicate with one serving eNB in the cell (or sector), and a multi-cell MIMO user 160 located at a cell edge may communicate with a plurality of serving eNBs in a plurality of cells (or sectors).

As described above, eNBs (or cells) perform a CoMP operation for a UE in a multi-cell environment. However, a technique for efficiently estimating interference from neighbor cells to improve the performance of a UE at a cell edge is yet to be specified for an FFR-based CoMP operation under a multi-cell environment.

SUMMARY OF THE INVENTION

Accordingly, the present invention is directed to a method for estimating channel state in a wireless communication system using fractional frequency reuse and a mobile station using the same that substantially obviate one or more problems due to limitations and disadvantages of the related art.

An object of the present invention is to provide a method for estimating channel state in a wireless communication system using Fractional Frequency Reuse (FFR).

Another object of the present invention is to provide a Mobile Station (MS) for estimating channel state in a wireless communication system using FFR.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for estimating a channel state at an MS in a wireless communication system using FFR includes acquiring cell Identifiers (IDs) of a serving cell and one or more neighbor cells, acquiring information about predefined power level patterns for one or more frequency partitions to which FFR is applied according to the acquired cell IDs, and estimating a channel state of the serving cell based on the power level pattern information.

The method may further include receiving from the serving cell a power level of a boosted frequency partition of the serving cell, and for the channel state estimation, channel states of the serving cell and/or the one or more neighbor cells may be estimated using the acquired power level pattern information and a power level of the boosted frequency partition of the serving cell.

The method may further include receiving cells from the one or more neighbor cells power levels of boosted frequency partitions boost of the one or more neighbor cell, and for the channel state estimation, channel states of the one or more neighbor cells may be estimated using the acquired power level pattern information and the power levels of the boosted frequency partitions of the one or more neighbor cells.

The method may further include feeding back channel state information generated based on the estimated channel state to the serving cell.

The predefined power level pattern information may include information indicating frequency partitions set as boosted or non-boosted among the one or more frequency partitions to which the FFR is applied.

In another aspect of the present invention, an MS for estimating a channel state in a wireless communication system using FFR includes a cell ID acquisition module for acquiring cell IDs of a serving cell and one or more neighbor cells, a power level pattern acquisition module for acquiring information about predefined power level patterns for one or more frequency partitions to which FFR is applied according to the cell IDs, and a channel estimation module for estimating a channel state of the serving cell based on the power level pattern information.

The MS may further include a reception module for receiving from the serving cell a power level of a boosted frequency partition of the serving cell, and the channel estimation module may estimate channel states of the serving cell and/or the one or more neighbor cells using the acquired power level pattern information and a power level of the boosted frequency partition of the serving cell.

The MS may further include a reception module for receiving cells from the one or more neighbor cells power levels of boosted frequency partitions of the one or more neighbor cells, and the channel estimation module may estimate channel states of the one or more neighbor cells using the acquired power level pattern information and the power levels of the boosted frequency partitions of the one or more neighbor cells.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a $3^{rd}$ Generation Partnership Project (3GPP) Long Term Evolution (LTE) system. However, the description is applicable to any other mobile communication system except for specific features inherent to the 3GPP LTE system.

In some instances, known structures and devices are omitted, or are shown in a block diagram form focusing on important features of the structures and devices, so as not to obscure the concept of the present invention. The same reference numbers will be used throughout this specification to refer to the same or like parts.

In the following description, 'User Equipment (UE)' is assumed to refer to a mobile or fixed user end device such as a Mobile Station (MS), an Advanced Mobile Station (AMS), etc. and 'enhanced Node B (eNB or eNode B)' is assumed to refer to any node of a network end, such as a Node B, a Base Station (BS), an Access Point (AP), etc., communicating with the UE.

In a mobile communication system, a UE may receive information from an eNB on a DownLink (DL) and transmit information to the eNB on an UpLink (UL). The information transmitted from or received at the UE includes data and various control information and a variety of physical channels are defined according to the types and usages of the information.

Figure 1:
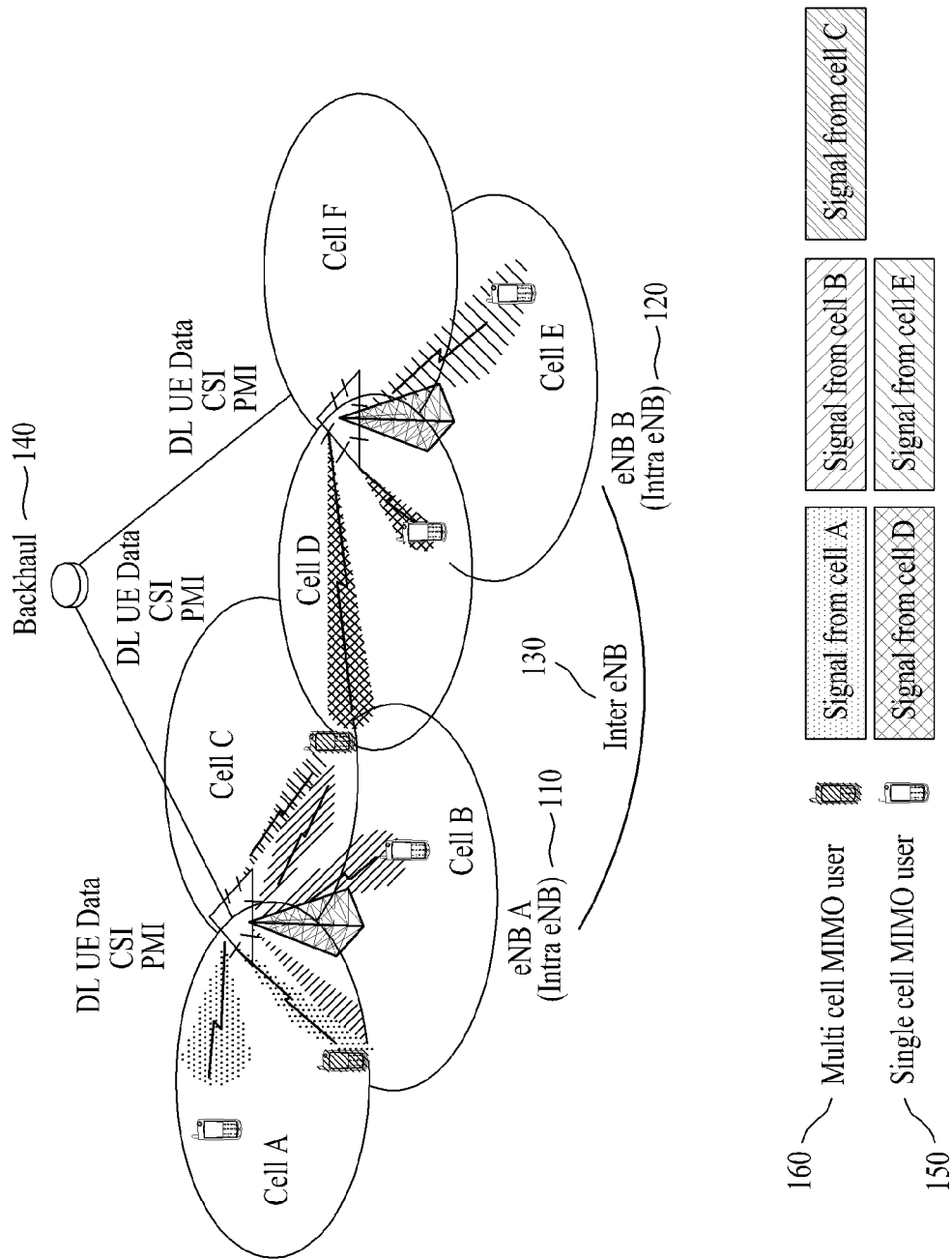
FIG. 1 illustrates the concept of conventional intra-enhanced Node B (eNB) Coordinated Multi-Point (CoMP) and inter-eNB CoPM.
Figure 2:
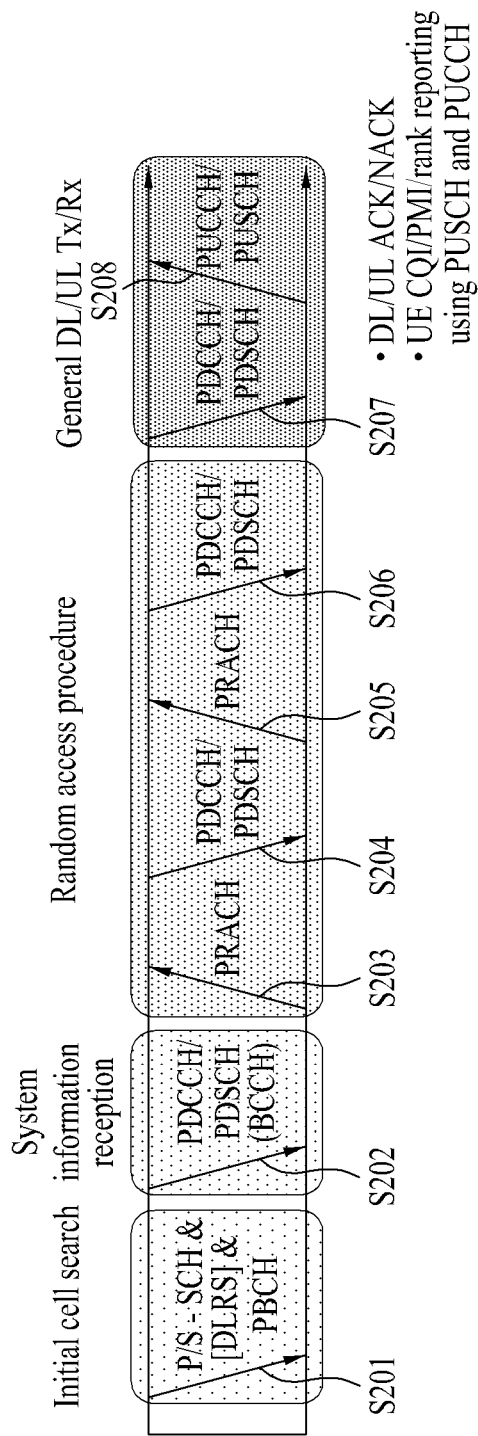
FIG. 2 illustrates physical channels used in a mobile communication system, $3^{rd}$ Generation (3G) Partnership Project (3GPP) Long Term Evolution (LTE) and a general signal transmission method using the physical channels.

FIG. 2 illustrates physical channels used in a mobile communication system, 3GPP LTE and a general signal transmission method using the physical channels.

Referring to FIG. 2, upon power-on or when initially entering a cell, a UE performs initial cell search that involves acquisition of synchronization with an eNB in step S201. More specifically, the UE acquires synchronization with the eNB and information such as a cell Identifier (ID) by receiving a Primary Synchronization CHannel (P-SCH) and a Secondary Synchronization CHannel (S-SCH) from the eNB. Subsequently, the UE may acquire information broadcast within the cell by receiving a Physical Broadcast CHannel (PBCH). Meanwhile, the UE may determine a DL channel state by receiving a DL Reference Signal (RS) during the initial cell search.

After the initial cell search, the UE may further acquire specific system information by receiving a Physical Downlink Control CHannel (PDCCH) and a Physical Downlink Shared CHannel (PDSCH) associated with the PDCCH in step S202.

If the UE initially accesses the eNB or radio resources for signal transmission have not been allocated to the UE yet, the UE may perform a random access procedure in steps S203 through S206. Specifically, the UE may transmit a predetermined sequence to the eNB on a Physical Random Access CHannel (PRACH) in step S203 and receive a response message for the transmitted sequence on a PDCCH and a PDSCH associated with the PDCCH in step S204. For contention-based random access except handover, the UE may perform a contention resolution procedure by transmitting an additional PRACH in step S205 and receiving a PDCCH and a PDSCH associated with the PDCCH in step S206.

Then, a general DL/UL transmission/reception procedure follows. To be more specific, the UE receives a PDCCH and a PDSCH associated with the PDCCH in step S207 and transmits a Physical Uplink Shared CHannel (PUSCH) and a Physical Uplink Control CHannel (PUCCH) in step S208. Control information that the UE transmits to the eNB on the UL or receives from the eNB on the DL includes a DL/UL ACKnowledgment/Negative ACKnowledgment (ACK/NACK) signal, a Channel Quality Indicator (CQI)/Precoding Matrix Index (PMI)/Rank Indicator (RI), etc. In the 3GPP LTE system, the UE may transmit control information such as a CQI, PMI and RI on a PUSCH and/or a PUCCH.

The term used herein, "eNB" is interchangeable with "cell" or "sector" when it is used in a geographical sense. A serving eNB (or cell), which may be regarded as a conventional eNB that provides main services, can transmit and receive control information in CoMP. In this context, the serving eNB (or cell) may be referred to as an anchor eNB (or cell). Similarly, a neighbor eNB may also be called a neighbor cell in a geographical sense. The terms "cell" and "sector" are meant to refer to basic network elements that implement FFR. Thus these terms are interchangeably used with each other in that both a cell and a sector provide a service to a UE at a cell edge by FFR.

A CoMP operation may improve the communication performance of a UE at a cell edge in a multi-cell environment. There are largely two CoMP operation modes, Joint Processing (JP) mode which is cooperative Multiple Input Multiple Output (MIMO) based on data sharing and Coordinated Scheduling/Beamforming (CS/CB) mode which is branched into worst companion and best companion, aiming to reduce inter-cell interference. The worst companion scheme reduces interference as a UE reports worst PMIs that cause the severest interference for cells that perform a CoMP operation (CoMP cells) to a serving eNB and thus the CoMP cells use sub-optimal PMIs except the worst PMIs. Compared to the worst companion scheme, the UE reports best PMIs that cause the least interference for the CoMP cells to the serving eNB and thus the CoMP cells use the best PMIs to thereby reduce inter-cell interference in the best companion scheme. In this context, it can be said that CoMP covers communication schemes in which a serving eNB and a neighbor eNB cooperate for a UE in a multi-cell environment.

To implement FFR in the multi-cell environment, each eNB may use different frequency bands (or a different Frequency Partitions (FPs) on a subchannel. However, some tones are commonly used in all sectors, thus with a frequency reuse factor of 1, whereas other tones are used in the sectors, ⅓ of the tones in each sector and thus with a frequency reuse factor of ⅓. The frequency reuse factor may vary with network setting. FFR schemes are classified into hard FFR and soft FFR. While some tones are not used in hard FFR, some tones are used at a low power level in soft FFR. Thus, FFR may be implemented in various manners depending on setting and reduce inter-cell interference effectively. Accordingly, FFR configuration information should be shared between eNBs and/or UEs to effectively implement FFR in a real application.

Particularly in soft FFR, a UE needs to know the transmission power of each frequency band (or FP) when measuring CQIs from signals received from a plurality of cells. That is, it is necessary to estimate information such as the interference levels of neighbor eNBs, for performing an efficient CoMP operation using FFR in a multi-cell environment.

In case of cell edge UEs, Reception performance of signals may be degraded due to interference from neighbor cells. However, multi-cell based FFR scheme can increase the performance of UEs at a cell edge by reducing interference from neighbor cells. Multi-cell FFR may be regarded as a special case of CS/CB in a CoMP system.

In a environment using multi-cell based FFR, cells that implement FFR may reduce inter-cell interference that affects a UE located at a cell edge operating in a specific frequency band, by setting a specific band in boosting or non-boosting by the cells.

Figure 3:
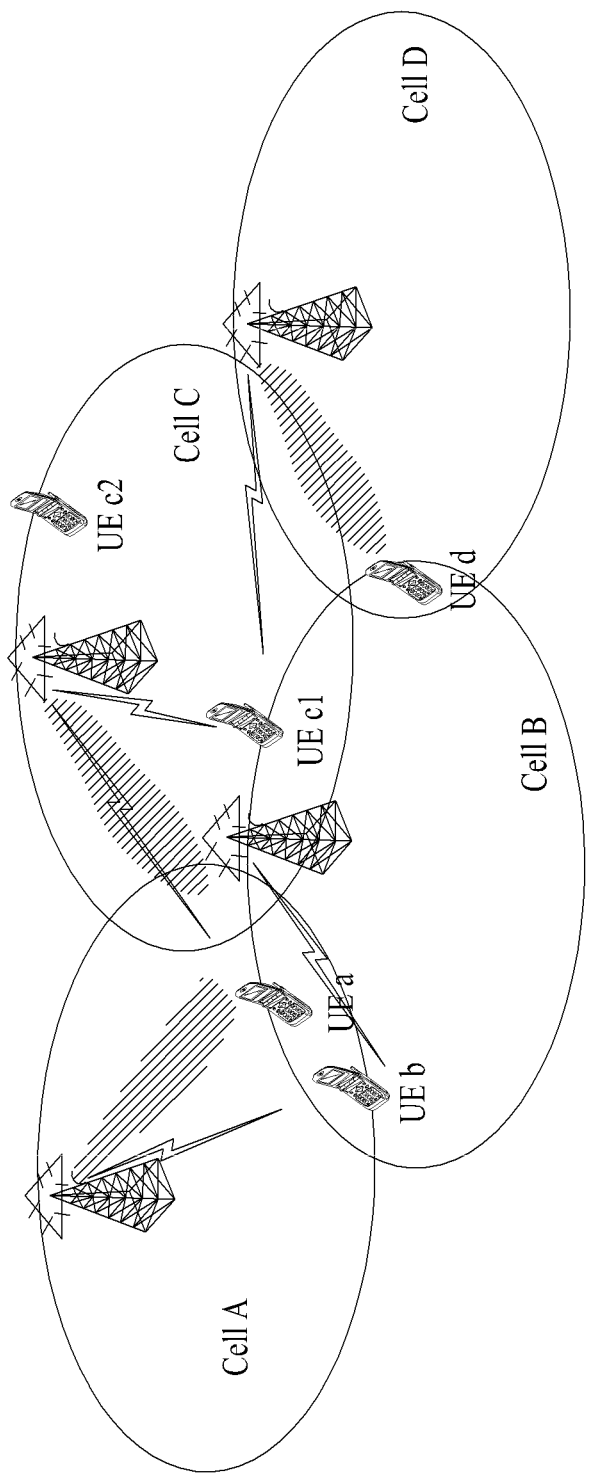
FIG. 3 illustrates an example in which a User Equipment (UE) receives a service from one or more eNBs according to the location of the UE within a cell in a multi-cell environment.

FIG. 3 illustrates an example in which a UE receives a service from one or more eNBs according to its location within a cell in the multi-cell environment.

Referring to FIG. 3, UE a belongs to Cell A and thus receives a service from Cell A. However, since UE a is located at a cell edge between Cell A and Cell B, UE a may be affected by Cell B. Similarly, although UE b belongs to Cell B and thus receives a service from Cell B, UE b may be affected by Cell A since UE b is located at a cell edge between Cell A and Cell B. Cell C services UE c1 but Cell B may affect UE c1 due to its location at a cell edge between Cell C and Cell B. Cell C also services UE c2 but a neighbor cell (not shown) may affect UE c2 due to its location at a cell edge between Cell C and the neighbor cell. Although UE d receives a service from Cell D, Cells B and C may affect UE d because it is located at a cell edge among Cells B, C and D.

Because UEs a, b, c1, c2 and d are affected simultaneously by their neighbor cells due to their locations at a cell edge between at least two cells, the data throughput of services that they receive may be decreased due to co-channel interference from the neighbor cells. On the contrary, UEs at cell centers (i.e. inner UEs) are immune to interference from neighbor cells.

Figure 4:
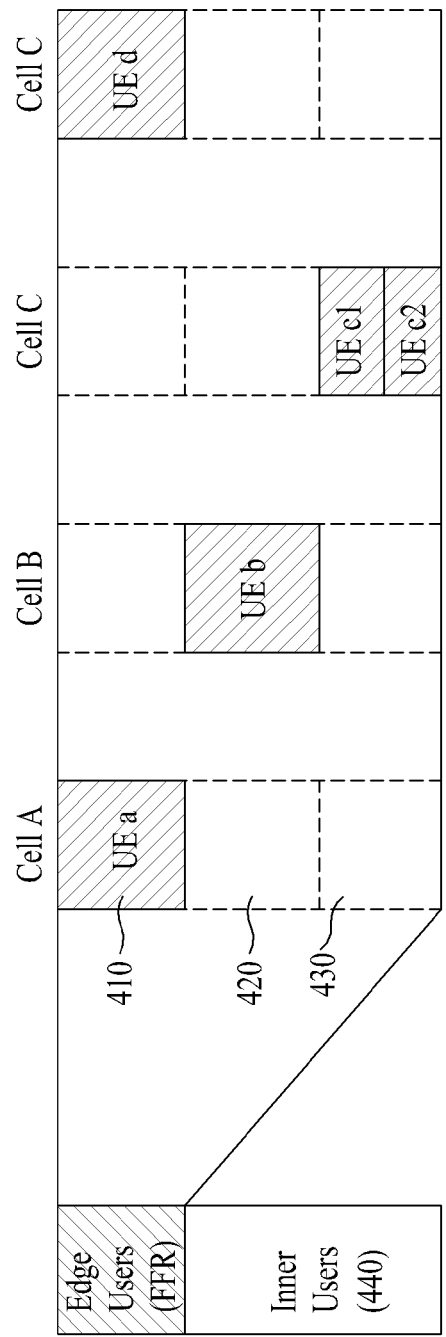
FIG. 4 illustrates an example of implementing hard Fractional Frequency Reuse (FFR) for an FFR-based CoMP operation in a multi-cell environment.

FIG. 4 illustrates an example of implementing hard FFR for an FFR-based CoMP operation in the multi-cell environment.

Referring to FIG. 4, total frequency resources available to cells may be grouped according to several criteria in relation to FFR implementation. First, the total frequency bands (or FPs) of the cells are divided largely into a frequency band for edge users (i.e. edge UEs) and a frequency band for inner users (i.e. inner UEs).

In FFR, the frequency band for edge users may be in turn divided into a plurality of smaller frequency bands. In the illustrated case of FIG. 4, the frequency reuse factor of FFR is ⅓ (FFR ⅓). In case of FFR ⅓, the frequency resources for the edge users are divided into three frequency areas and each eNB provides a service to edge users in one of the three frequency areas.

In accordance with the present invention, frequency resources available to each cell in servicing UEs may be grouped into a plurality of frequency resource groups. The frequency resource groups may be referred to as frequency bands or FPs. The frequency resource groups may be classified according to FFR-related usages. As illustrated in FIG. 4, total frequency resource groups available to cells may be divided into three frequency bands according to FFR-related usages.

For Cell A, for example, a first frequency band 410 is a frequency resource group used for edge users, denoted by "FFR_band_edge". Second frequency bands 420 and 430 are frequency resource groups that are not used for the edge users among frequency resource groups designated as used for edge users, denoted by "FFR_band_inner". A third frequency band 440 is a frequency resource group for inner users, denoted by "inner_band".

As illustrated in FIG. 4, each cell uses only ⅓ of frequency resources allocated to edge users, for edge users of the cell. Therefore, the frequency reuse factor for the cell edge users is ⅓. On the other hand, the whole frequency resources allocated to inner users are used for inner users in the cells. Hence, the frequency reuse factor is 1 for the inner users.

Figure 5:
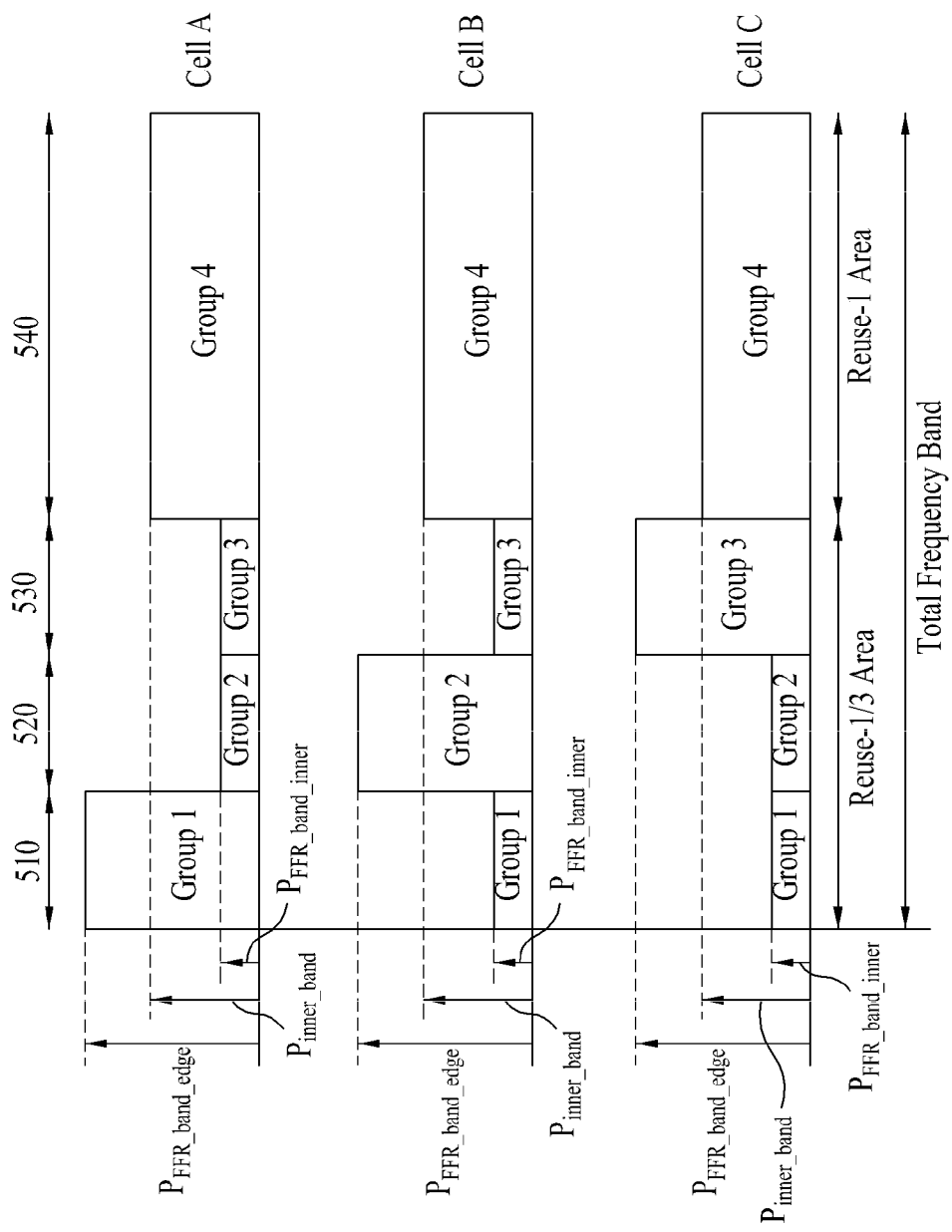
FIG. 5 illustrates an example of implementing soft FFR for an FFR-based CoMP operation in a multi-cell environment.

FIG. 5 illustrates an example of implementing soft FFR for an FFR-based CoMP operation in the multi-cell environment.

Referring to FIG. 5, total frequency resources available to cells may be divided into four frequency resource groups 510 to 540 (Group 1 to Group 4). Group 1, Group 2 and Group 3 are frequency resources allocated to edge UEs of the cells, corresponding to the frequency resource groups 410, 420 and 430 illustrated in FIG. 4. Group 4 is a frequency resource group allocated to inner UEs at cell centers, corresponding to the frequency resource group 440 illustrated in FIG. 4. Cells A, B and C in FIG. 5 correspond to Cells A, B and C in FIG. 4.

The soft FFR illustrated in FIG. 5 is implemented in a similar manner to the hard FFR illustrated in FIG. 4, except that the soft FFR may prevent a decrease in bandwidth efficiency, which is encountered with the hard FFR due to non-use of some frequency resource groups (for example, the frequency resource groups 420 and 430 in Cell A in FIG. 4). The following description will be made in the context of Cell A. Total frequency resources available to Cell A may be divided into four frequency resource groups. In FIG. 5, Group 1, Group 2 and Group 3 are used for UEs at cell edges, with a frequency reuse factor of 1. Therefore, Cell A may provide a service to UEs at its cell edge in one of Group 1, Group 2 and Group 3, that is, Group 1 (FFR_band_edge). The other two frequency resource groups, Group 1 and Group 2 (FFR_band_inner) may not be used for the edge UEs. In the mean time, Group 4 is a frequency resource group (inner_band) that is allocated to UEs at the center of Cell A, with a frequency reuse factor of 1.

Compared to the hard FFR illustrated in FIG. 4, Cell A may provide a service to inner UEs additionally in Group 2 and Group 3 (FFR_band_inner) in the soft FFR scheme. For this purpose, Cell A sets low transmission power for Group 2 and Group 3 to thereby avoid interference with UEs at cell edges of Cell B and Cell C.

In this manner, the soft FFR may increase frequency efficiency by grouping frequency resources and setting different transmission power levels for the frequency resource groups according to their usages.

In the illustrated case of FIG. 5, three power levels may be defined to service UEs in each cell according to the usages of the frequency resource groups, such that PFFR_band_edge≥Pinner_band>PFFR_band_inner. A service may be provided to edge UEs at the power level PFFR_band_edge in the frequency resource group FFR_band_edge with the frequency reuse factor of ⅓, to inner UEs at the power level PFFR_band_inner in the frequency resource groups FFR_band_inner with the frequency reuse factor of ⅓, and to inner UEs at the power level Pinner_band in the frequency resource group inner_band with the frequency reuse factor of 1.

For efficient implementation of the soft FFR, a power level needs to be set for each frequency resource group and an eNB and/or a UE needs to know the power levels of frequency resource groups. Especially to efficiently operate in CoMP CS (Coordinated Scheduling) mode using FFR in the multi-cell environment, the UE needs to estimate information such as the interference levels of neighbor cells. Preferably, the UE has knowledge of the power levels of the frequency resource groups in each neighbor cell as well as the power levels of the frequency resource groups in a serving cell, in order to efficiently estimate CQIs or the like.

An adaptive FFR scheme may be considered to efficiently implement FFR according to a distribution of users within a cell (or sector). The adaptive FFR scheme flexibly adjusts the bandwidth or proportion of each frequency resource group. For implementation of the adaptive FFR scheme, each eNB and/or UE needs to know information about the bandwidth or proportion of each frequency resource group.

Now a description will be made of FFR information required for implementing FFR for a CoMP operation in the multi-cell environment.

A serving eNB may notify a UE that performs FFR for a CoMP operation of a boosted frequency resource group and a non-boosted frequency resource group of a serving cell and/or one or more neighbor cells. The notification may be made by transmitting a bitmap or by transmitting the index of the boosted frequency resource group of the serving cell and/or the one or more neighbor cells.

In the case where a plurality of cells that implement FFR use an identical boosting level and an identical non-boosting level and the boosting and non-boosting levels are preset, the power levels may be expressed in on/off binary codes. Then the serving eNB may have only to notify the UE whether each of the frequency resource groups used in the serving cell and the neighbor cells is boosted or not. If the boosting power levels are equal in all FFR cells, the boosting power level may be predefined or the boosting power level of each neighbor cell may be set to be equal to that of the serving cell.

Alternatively or additionally, patterns of boosting and non-boosting power level may be preset with respect to FFR factors (e.g. FFR ½, ⅓, ¼, . . . , 1/n). Thus the serving eNB may notify the UE of only the FFR boosting level patterns of the cells according to a frequency reuse factor. Hereinbelow, FFR boosting level patterns will be described, by way of example.

Referring to FIG. 5, FFR is implemented with a frequency reuse factor of ⅓. Three boosting level patterns may be defined for the frequency reuse factor of ⅓. Each of cells that implement the FFR may determine the transmission power levels of its frequency resource groups according to the boosting power level and non-boosting power level of one of the three FFR boosting level patterns.

[Table 1] below tabulates an example of FFR boosting level patterns for cells, in case of a frequency reuse factor of ⅓.

TABLE 1

|        | Group 1       | Group 2       | Group 3       |
|--------|---------------|---------------|---------------|
| Cell A | boosting      | non-boosting  | non-boosting  |
| Cell B | non-boosting  | boosting      | non-boosting  |
| Cell C | non-boosting  | non-boosting  | boosting      |

Referring to [Table 1], first, second and third FFR boosting level patterns may be defined as [Group 1, Group 2, Group 3]=[boosting, non-boosting, non-boosting], [Group 1, Group 2, Group 3]=[non-boosting, boosting, non-boosting], and [Group 1, Group 2, Group 3]=[non-boosting, non-boosting, boosting], respectively.

[Table 2] below tabulates an example of FFR boosting level patterns for cells, in case of a frequency reuse factor of ¼.

TABLE 2

|        | Group 1       | Group 2       | Group 3       | Group 4       |
|--------|---------------|---------------|---------------|---------------|
| Cell A | boosting      | non-boosting  | non-boosting  | non-boosting  |
| Cell B | non-boosting  | boosting      | non-boosting  | non-boosting  |
| Cell C | non-boosting  | non-boosting  | boosting      | non-boosting  |
| Cell D | non-boosting  | non-boosting  | non-boosting  | Boosting      |

Referring to [Table 2], when an FFR factor is ¼, there may be four FFR boosting level patterns. For example, first to fourth FFR boosting level patterns may be defined respectively as [Group 1, Group 2, Group 3, Group 4]=[boosting, non-boosting, non-boosting, non-boosting], [Group 1, Group 2, Group 3, Group 4]=[non-boosting, boosting, non-boosting, non-boosting], [Group 1, Group 2, Group 3, Group 4]=[non-boosting, non-boosting, boosting, non-boosting], and [Group 1, Group 2, Group 3, Group 4]=[non-boosting, non-boosting, non-boosting, boosting]. The serving cell may notify the UE of the FFR boosting level patterns of the neighbor cells as described above.

Aside from the above-described method for notifying a UE of the boosting and non-boosting levels of frequency bands used in a plurality of cells that implement FFR by an eNB, the UE may select a preset FFR boosting power level pattern based on a cell ID. Hence, FFR may be efficiently implemented without any particular indication from the eNB. That is, the UE can efficiently perform FFR based on the cell IDs of neighbor cells that implement FFR. The UE uses a preset FFR boosting power level pattern according to a cell function of each neighbor cell (e.g. (cell ID modulus (1/FFR factor)). In this case, the UE has only to acquire the cell IDs of the neighbor cells during measuring about the neighbor cells. Also, the UE can acquire ID of serving cell. The cells that implement FFR may use an identical boosting power level and an identical non-boosting power level.

For example, in an FFR-⅓ system, a UE may use a preset FFR boosting power level pattern according to the (Cell ID modulus 3) of each neighbor cell. Referring to [Table 1], if (Cell ID modulus 3)=0, [boosting, non-boosting, non-boosting] is given as the FFR boosting level pattern of Cell A. If (Cell ID modulus 3)=1, the FFR boosting level pattern of Cell B is [non-boosting, boosting, non-boosting]. In the same manner, if (Cell ID modulus 3)=2, [non-boosting, non-boosting, boosting] is given as the FFR boosting level pattern of Cell C. In this manner, once the UE has information about preset mapping between FFR boosting level patterns and cell IDs, it can perform FFR efficiently simply with the cell IDs.

As described above, each UE may implement FFR according to an FFR boosting level pattern that specifies a boosting or non-boosting level for each physical frequency region, when using a predetermined power level pattern based on a cell ID.

Aside from this method, it may be further contemplated that a boosted physical frequency region for each cell is designated as Group 1 and FFR is implemented according to a power level pattern that is predetermined based on the group indexing. More specifically, Group 1 may always be preset as a boosted frequency region, instead of performing an FFR operation according to different boosted frequency resource groups set for different cells (for example, Group 1, Group 2 and Group 3 is set respectively for Cell A, Cell B and Cell C, for an FFR operation in FIG. 5). In this case, the UE also performs the cell ID-based FFR using a predetermined power level pattern based on the group indexing.

Referring to FIG. 5, in the case where a power level pattern is used according to a cell ID in the manner described before, if (cell ID modulus 3=0), the FFR boosting level pattern of [Group 1, Group 2, Group 3]=[boosting, non-boosting, non-boosting] is given for Cell A. Cell B with (cell ID modulus 3=1) has the FFR boosting level pattern of [Group 1, Group 2, Group 3]=[non-boosting, boosting, non-boosting]. In the same manner, the FFR boosting level pattern of [Group 1, Group 2, Group 3]=[non-boosting, non-boosting, boosting] is set for Cell C with (cell ID modulus 3=2).

Meanwhile, if the boosted frequency regions are all designed as Group 1, the FFR boosting level patterns are respectively defined as [Group 1, Group 2, Group 3]=[boosting, non-boosting, non-boosting] or [Group 1, Group 3, Group 2]=[boosting, non-boosting, non-boosting] for Cell A with (cell ID modulus 3=0) and as [Group 2, Group 1, Group 3]=[non-boosting, boosting, non-boosting] or [Group 3, Group 1, Group 2]=[non-boosting, boosting, non-boosting] for Cell B with (cell ID modulus 3=1).

In the same manner, for cell C with (cell ID modulus 3=2), the FFR boosting level pattern is [Group 2, Group 3, Group 1]=[non-boosting, non-boosting, boosting] or [Group 3, Group 2, Group 1]=[non-boosting, non-boosting, boosting].

As the boosted physical frequency region of each cell is labeled with the same group index (e.g. Group 1), different group indexes may be allocated to the same physical frequency regions for different cells. New FFR boosting level patterns created by indexing the boosted physical frequency region of each cell as Group 1 and indexing the other frequency regions of the cell as Group 2 and Group 3 may be signaled to each UE by an eNB or may be known beforehand to the UE without additional signaling.

In this manner, each UE may implement FFR using a predetermined power level pattern for each cell ID according to the above group indexing of a boosted frequency region as Group 1, which will be described with reference to FIG. 6.

Figure 6:
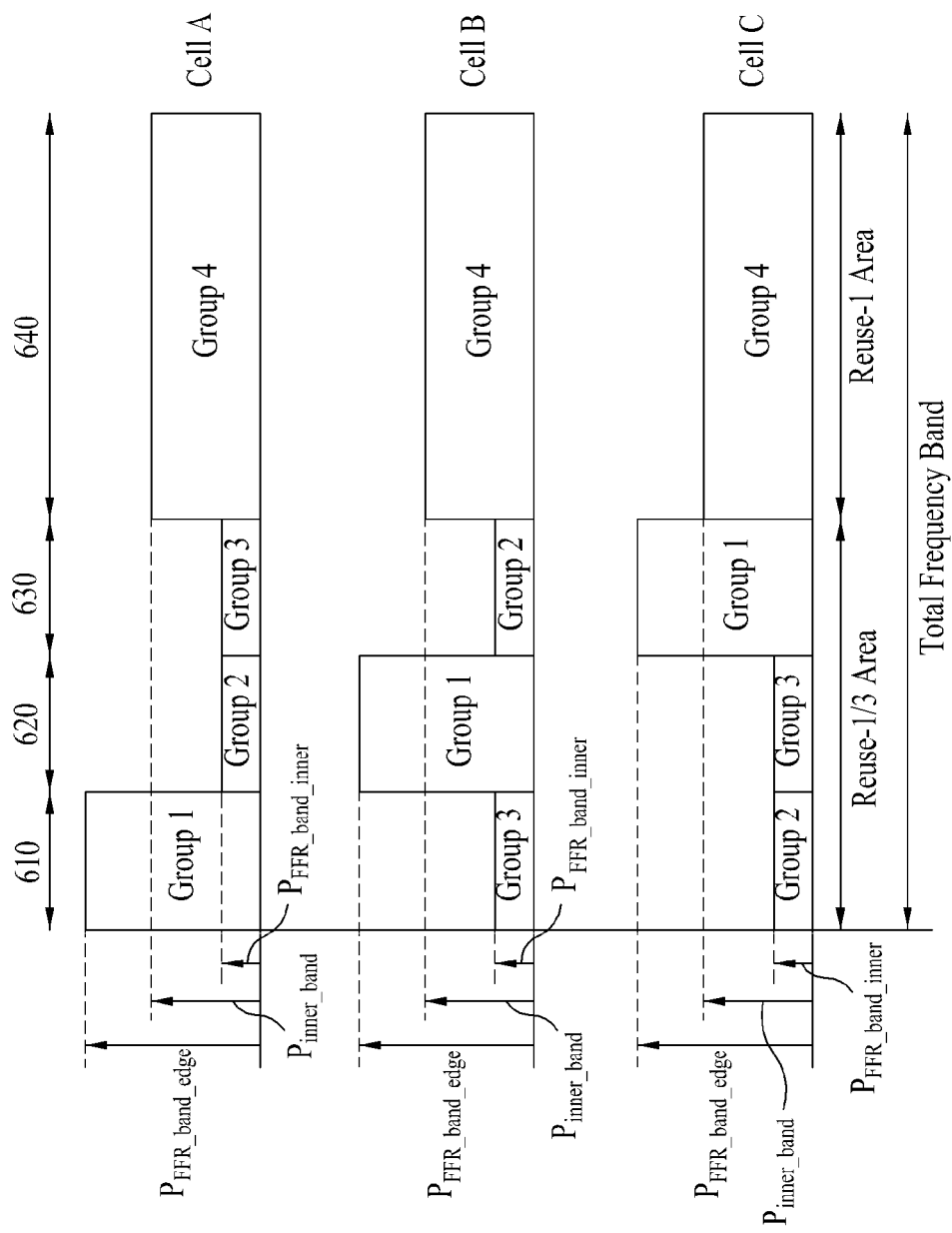
FIG. 6 illustrates another example of implementing soft FFR for an FFR-based CoMP operation in a multi-cell environment.

FIG. 6 illustrates another example of implementing soft FFR for an FFR-based CoMP operation in a multi-cell environment.

Compared to the illustrated case of FIG. 5 in which FFR frequency regions of each cell are physically aligned, that is, the same physical frequency regions of different cells are indexed as the same numbers (e.g. the frequency area 610 as Group 1, the frequency area 620 as Group 2, and the frequency area 630 as Group 3), physical frequency regions may be indexed in different manners for different cells. Specifically, a physical frequency region 610 may be indexed as Group 1 being a boosted frequency area for Cell A, as a non-boosted frequency area, Group 3 for Cell B, and as a non-boosted frequency area, Group 2 for Cell C.

Similarly, a physical frequency region 620 may be indexed as Group 2 for Cell A, as Group 1 for Cell B, and as Group C for Cell C.

In this manner, the same physical frequency region may be labeled with different indexes for different cells.

A UE's operation for acquiring cell IDs from one or more neighbor cells that operate in CoMP mode (i,e, coordination mode between cells), for efficient cell ID-based FFR, will be described in brief.

Figure 7:
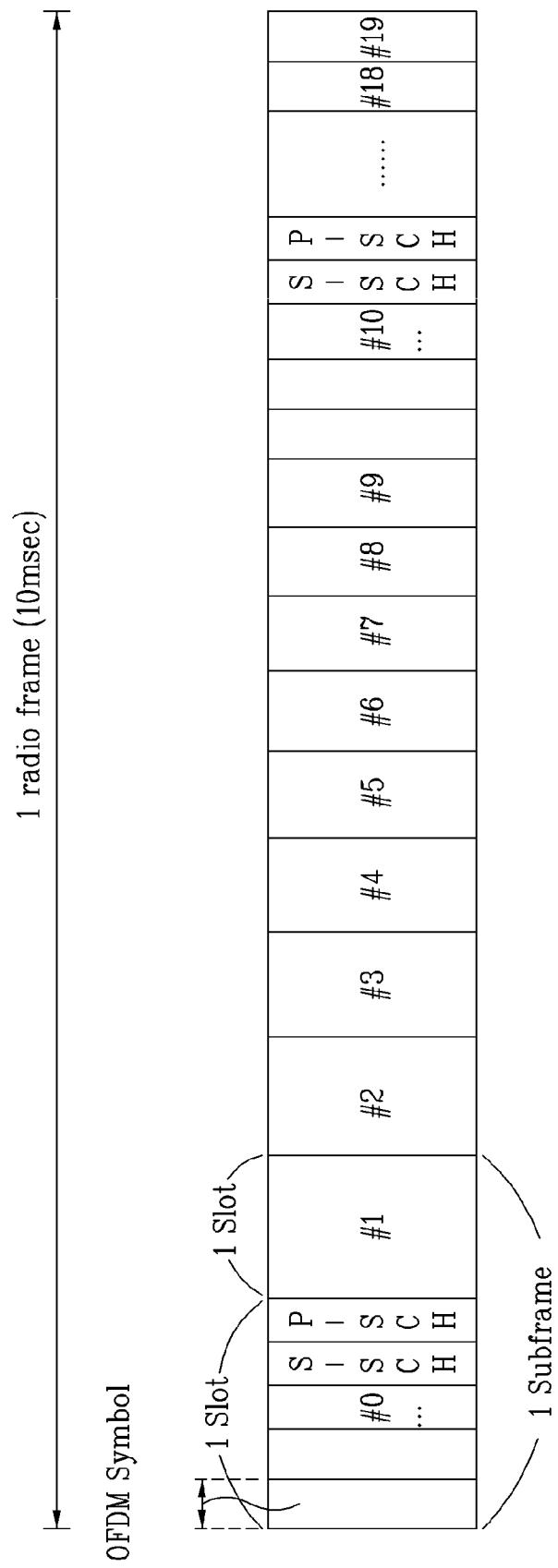
FIG. 7 illustrates an exemplary format of a Frequency Division Duplex (FDD) DownLink (DL) frame in the 3GPP LTE mobile communication system.

FIG. 7 illustrates an exemplary format of a Frequency Division Duplex (FDD) DL frame in the 3GPP LTE mobile communication system as an example of mobile communication system.

Referring to FIG. 7, one downlink frame may include 10 subframes, each subframe having two slots. Each slot may have 6 or 7 Orthogonal Frequency Division Multiplexing (OFDM) symbols. To be more specific, one slot may include 7 OFDM symbols, when a normal Cyclic Prefix (CP) is used, whereas one slot may include 6 OFDM symbols when an extended CP is used.

A Primary Synchronization CHannel (P-SCH) and a Secondary Synchronization CHannel (S-SCH) may be allocated to the first slots of subframe 0 and subframe 5. A Primary Synchronization Signal (PSS) may be mapped to the last OFDM symbols of slot 0 and slot 10, and a Secondary Synchronization Signal (SSS) may be mapped to the symbols previous to the symbols carrying the PSS.

In the LTE system, a UE may not have information about neighbor cells that operate in CoMP, but receive cell ID set information including neighbor cell ID information from a serving eNB. Therefore, the UE may identify the neighbor cells using a cell ID set and the SCHs of the neighbor cells.

There are 504 Physical Cell Identifiers (PCIs) in the LTE system. The 504 PCIs are grouped into 168 cell ID groups, each having three cell IDs. A PCI is expressed as the following equation.

$$N_{ID}^{cell}=3N_{ID}^{(1)}+N_{ID}^{(2)}$$ [Equation 1]

where $N_{ID}^{cell}$ denotes the PCI, $N_{ID}^{(1)}$ denotes the number of a PCI group, ranging from 0 to 167, and $N_{ID}^{(2)}$ denotes the number of a PCI within the PCI group, ranging from 0 to 2.

The UE may acquire information about a cell ID out of three cell IDs within a cell ID group from a PSS and information about a cell ID group out of 168 cell ID groups from an SSS. Thus the UE may identify a neighbor cell based on the acquired cell ID group and cell ID. That is, the UE may acquire a sequence that a neighbor cell uses for pilot transmission, from the SCHs of the neighbor cell.

A sequence d(n) used for the PSS of a neighbor cell is generated from a frequency-domain Zadoff-Chu sequence $d_u(n)$ according to $$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases}$$ [Equation 2]

where the Zadoff-Chu root sequence index u is given as

TABLE 3

| $N_{ID}^{(2)}$ | Root Index u |
|---|---|
| 0 | 25 |
| 1 | 29 |
| 2 | 34 |

[Table 3] above illustrates the root indexes for PSSs. A PSS sequence may be generated using a root index illustrated in [Table 3].

An SSS sequence d(0), . . . , d(61) is an interleaved concatenation of two length-31 binary sequences. The concatenated sequence is scrambled with a scrambling sequence given by the PSS.

The combination of two length-31 sequences defining the SSS differs between subframe 0 and subframe 5 according to $$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 3]

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \le n \le 30$ and the indexes $m_0$ and $m_1$ are derived from the PCI group $N_{ID}^{(1)}$ according to $$m_0 = m' \bmod 31$$ [Equation 4]
$$m_1 = (m_0 + \lfloor m'/31 \rfloor + 1) \bmod 31$$
$$m' = N_{ID}^{(1)} + q(q+1)/2, \quad q = \left\lfloor \frac{N_{ID}^{(1)} + q'(q'+1)/2}{30} \right\rfloor,$$
$$q' = \lfloor N_{ID}^{(1)}/30 \rfloor$$

When the UE performs FFR efficiently using a preset FFR boosting level pattern based on a cell ID, the cell ID may be a physical cell ID or a global cell ID, or both.

A boosting power level and a non-boosting power level may be differently set in a plurality of cells that implement FFR in the multi-cell environment. The boosting and non-boosting power levels of each cell may be predefined as quantized power values. The serving eNB may notify the UE of indexes indicating the quantized power values of the boosting and non-boosting power levels of each cell.

The serving eNB may transmit a bitmap indicating the quantized power value of each frequency resource group to the UE. In addition to the quantized power values of each cell, the serving eNB may indicate the index of the boosted frequency resource group of each cell to the UE. For example, if 9 power levels $P_0$ to $P_9$ are defined for frequency resource groups and three cells operate in FFR for three frequency resource groups, the following bitmap may be configured.

TABLE 4

| | Group 1 | Group 2 | Group 3 |
|---|---|---|---|
| Cell A | $P_0$ | $P_1$ | $P_5$ |
| Cell B | $P_4$ | $P_2$ | $P_1$ |
| Cell C | $P_0$ | $P_6$ | $P_1$ |

As described above, the UE efficiently estimates the interference levels of neighbor cells based on FFR information received from the serving eNB. Therefore, the communication performance of a cell edge user is improved.

The specifics of FFR information that a serving eNB transmits to a UE have been described above. The serving eNB may transmit the FFR information to the UE in two methods depending on how a CoMP set is configured. Hence, a description will first be made of methods for configuring a CoMP set in a CoMP wireless communication system.

For an efficient CoMP operation, it is necessary to define neighbor cells that will perform a CoMP operation for a UE. A CoMP set may be defined as a set of neighbor cells that will operate in CoMP for a UE.

First of all, both the serving eNB and the UE may share information about the CoMP set in advance.

The CoMP set may be configured based on UE measurements. This CoMP set configuration based on UE measurements ensures flexibility in setting a CoMP set with neighbor cells that directly affect the UE. The UE may make a neighbor cell list by receiving a list of neighbor cells from the serving eNB beforehand or by measuring about neighbor cells on its own. The UE measures the interference levels of neighbor cells listed in the neighbor cell list. The interference level of a neighbor cell may be Reference Symbol Received Power (RSRP), Reference Symbol Received Quality (RSRQ), Reference Signal Strength Indicator (RSSI), Carrier to Interference plus Noise Ratio (CINR), Signal to Interference plus Noise Ratio (SINR), Propagation Delay (PD), or the like.

In this manner, the UE may measure the channel quality state between the UE and a cell based on an RSRP being the power of a pilot signal received from the cell in the LTE system. An RSRP is a linear average of power distributed across resource elements to which a cell-specific RS is allocated in a measured frequency bandwidth. The power of each resource element in a resource block may be determined from the received energy of a valid symbol period except for a CP. The RSRP may be applicable to the UE in both Radio Resource Control_idle (RRC_idle) state and RRC_connected state. If the UE operates in receive diversity, a reported value is equivalent to a linear average of the power values of all diversity branches.

The UE may report information required for CoMP set configuration to the serving eNB based on the measurements of the neighbor cells (e.g. RSRP measurements). The reported information may include one or more of the aforedescribed measurements of each neighbor cell and the cell ID of each neighbor cell. When the UE makes a neighbor cell list on its own, cell IDs of the one or more neighbor cells included the neighbor cell list may be reported with the measurement information by the UE. On the other hand, if the serving eNB provides the UE with a neighbor cell list in advance, the UE may transmit measurements about neighbor cells in a predetermined order of cell IDs, or both the measurements and indexes of the cell IDs. Or, the UE may arrange the indexes of cell IDs in an order of interference levels and transmit to the serving eNB the arranged indexes of cell IDs and measurements about neighbor cells corresponding to the arranged indexes of cell IDs.

When the serving eNB and the UE share information about a CoMP set, such as cell IDs, based on UE measurements as described above, the serving eNB may transmit preset FFR information about the CoMP set to the UE. More specifically, the serving eNB may transmit the FFR information in a predetermined order of cell IDs or in an order of interference levels corresponding to the cell IDs, without transmitting any cell ID information to the UE.

Secondly, the serving eNB may transmit information about a CoMP set to the UE.

The CoMP set configuration based on UE measurements may ensure the flexibility of CoMP set configuration at the risk of a significant increase in the measurement overhead and feedback transmission overhead of the UE. In this context, a CoMP set may be configured based on network parameters, to achieve an appropriate measurement overhead and feedback transmission overhead. Hence, the serving eNB may configure a CoMP set without UE measurements according to a predetermined criterion. Then the serving eNB needs to transmit information about the CoMP set to the UE. ID information about a plurality of cells included in the CoMP set may be indicated by temporary BS indexes. Specifically, the serving eNB may configure a CoMP set and transmit the temporary BS indexes of the neighbor cells (or neighbor eNBs) of the CoMP set to the UE. Along with the temporary BS indexes, the serving eNB may transmit FFR information associated with each temporary BS index to the UE (i.e. temporary BS indexes+FFR information).

The serving eNB may transmit the FFR information to the UE by higher layer signaling or Layer 1/Layer 2 (L1/L2) control signaling. By the higher layer signaling, the serving eNB may notify the UE of the cell IDs or cell ID indexes of the neighbor cells included in the CoMP set. When needed, the serving eNB may transmit the FFR information about the neighbor cells to the UE. In addition, the serving eNB may transmit the cell IDs (or cell ID indexes) and/or the FFR information to the UE periodically or in an event-triggered manner.

In general, the serving eNB may transmit scheduling assignments and other control information on a PDCCH. A physical control channel may be transmitted on an aggregation of one or several consecutive Control Channel Elements (CCEs), each CCR corresponding to 9 resource element groups. The number of resource element groups that are not assigned to a Physical Control Format Indicator CHannel (PCFICH) or a Physical Hybrid Automatic Repeat reQuest Indicator CHannel (PHICH) is $N_{REG}$. The CCEs available in the system are numbered from 0 to $N_{CCE-1}$ where $N_{CCE}=[N_{REG}/9]$. The PDCCH supports multiple formats listed in [Table 5]. A PDCCH occupying n consecutive CCEs starts only on a CCE fulfilling i mod n=0, where i is the CCE number. Multiple PDCCHs may be transmitted in one subframe.

TABLE 5

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to [Table 5], the eNB may select a PDCCH format depending on the number of areas in which control information is to be transmitted. The UE may read the control information on a CCE-by-CCE basis, thus reducing overhead.

As stated before, the serving eNB may transmit to the UE the cell IDs and FFR information of the cells included in the CoMP set by L1/L2 control signaling. That is, a PDCCH carrying the cell IDs and the FFR information may be configured in a Downlink Control Information (DCI) format different from a conventional DCI format. Or, to reuse the conventional DCI format, the DCI format of the PDCCH may be configured by still using some fields of the conventional DCI format and padding the other fields with zeroes or filling arbitrary values in the other fields.

Now a description will be made of a UE for estimating channel state in a CoMP operation mode using FFR according to the present invention.

Figure 8:
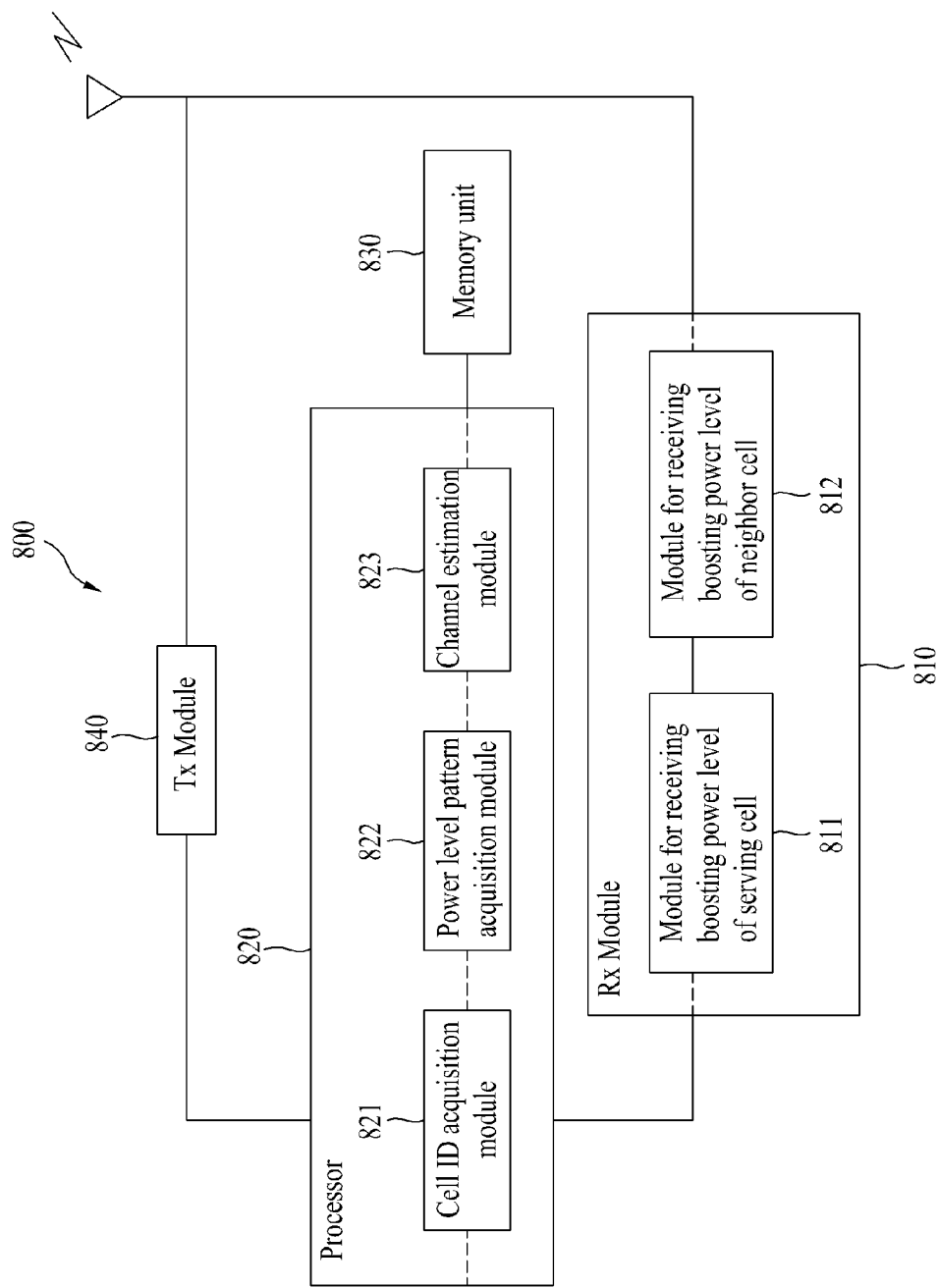
FIG. 8 is a block diagram of a UE according to an exemplary embodiment of the present invention.

FIG. 8 is a block diagram of a UE according to an exemplary embodiment of the present invention.

Referring to FIG. 8, a UE 800 includes a Reception (Rx) module 810, a processor 820, a memory unit 830, and a Transmission (Tx) module 840.

The Rx module 810 may include a module 811 and for receiving the boosting power level of a serving cell and a module 812 and for receiving the boosting power level of a neighbor cell. The Rx module 810 may receive signals or information from an external device such as a serving eNB. For example, the Rx module 810 may receive RSs from the serving cell and the neighbor cell to estimate channel states. On the other hand, the UE 800 may have prior knowledge of predefined power level patterns for one or more frequency bands to which FFR applies in the present invention.

The processor 820 may include a cell ID acquisition module 821, a power level pattern acquisition module 822, and a channel estimation module 823.

The cell ID acquisition module 821 may acquire cell IDs of the serving cell and one or more neighbor cells from them. The power level pattern acquisition module 822 may acquire predefined power level patterns according to the acquired cell IDs. The channel estimation module 823 may estimate the channel state of the serving cell using the acquired power level patterns. Also, the channel estimation module 823 may estimate the channel states of the serving cell and/or the one or more neighbor cells using the boosting power level of an FP boosted by the serving cell, received through the Rx module 811, as well as the acquired power level patterns. In addition, the channel estimation module 723 may estimate the channel states of the one or more neighbor cells using the boosting power levels of FPs boosted by the one or more neighbor cells, received through the Rx module 811, as well as the acquired power level patterns.

The memory unit 830 may store information received at the Rx module 811 and information calculated by the processor 820 for a predetermined time. The memory unit 830 may be replaced with a buffer (not shown).

The Tx module 840 may transmit signals, information, etc. to an external device such as the serving eNB. For example, the Tx module 840 may transmit the interference level measurements and cell IDs of the neighbor cells to the serving eNB. The Tx module 840 may also generate channel state information based on the estimated channel states of the neighbor cells and feed back the channel state information to the serving eNB.

As is apparent from the above description, a UE can accurately and efficiently estimate the channel states of cells that perform a CoMP operation using FFR.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining parts of the elements and/or features described in the embodiments of the present invention.

Accordingly, the present invention should not be limited to the specific embodiments described herein, but should be accorded the broadest scope consistent with the principles and features disclosed herein.

What is claimed is:

1. A method for estimating a channel state at a Mobile Station (MS) in a wireless communication system supporting a Coordinated Multi-Point (CoMP) operation and a Fractional Frequency Reuse (FFR) scheme, the method comprising:
   receiving information of a CoMP set from a serving cell, the CoMP set is configured by the serving cell, the CoMP set including cells perform a CoMP operation, the cells including the serving cell and at least one neighbor cell;
   acquiring information about a serving cell identifier (ID); and
   acquiring a downlink power level pattern applied to four frequency partitions configured to the serving cell among three downlink power level patterns using the acquired information about the serving cell ID according to a predefined rule when the FFR scheme is applied in the serving cell,
   wherein the acquired downlink power level pattern is different from a downlink power level pattern of a neighboring cell of the CoMP set,
   when the MS performs the CoMP operation based on the information of the CoMP set, transmitting a selected precoding matrix index (PMI) to the serving cell, the selected PMI act as a weakest interference or a strongest interference for the neighboring cell of the CoMP set performing the CoMP operation to the serving cell.

2. The method according to claim 1, further comprising:
   estimating a downlink channel state of the serving cell based on the acquired downlink power level pattern.

3. The method according to claim 1, further comprising:
   acquiring information about a neighboring cell identifier (ID); and
   acquiring a downlink power level pattern applied to the four frequency partitions configured to the neighboring cell among three downlink power level patterns using the acquired information about neighboring cell ID according to the predefined rule when the FFR scheme is applied in the neighbor cell.

4. The method according to claim 2, further comprising:
   feeding back channel state information generated based on the estimated downlink channel state to the serving cell.

5. The method according to claim 1, wherein the four frequency partitions include at least one boosted frequency partition and at least one non-boosted frequency partition.

6. The method according to claim 1, wherein the downlink power level pattern is determined according to a serving cell ID function value.

7. The method according to claim 6, wherein the serving cell ID function value is calculated by (serving cell ID modulus 1/FFR factor).

8. The method according to claim 3, further comprising:
   estimating a downlink channel state of the neighboring cell based on the acquired downlink power level pattern of the neighboring cell.

9. A Mobile Station (MS) for estimating a channel state in a wireless communication system supporting a Coordinated Multi-Point (CoMP) operation and a Fractional Frequency Reuse (FFR) scheme, the MS comprising:
   a receiver configured to receive information of a CoMP set from a serving cell, the CoMP set is configured by the serving cell, the CoMP set including cells perform a CoMP operation, the cells including the serving cell and at least one neighbor cell; and
   a processor,
   wherein the processor is configured to:
      acquire information about a serving cell identifier (ID); and
      acquire a downlink power level pattern applied to four frequency partitions configured to the serving cell among three downlink power level patterns using the acquired information about the serving cell ID according to a predefined rule when the FFR scheme is applied in the serving cell,
   wherein the acquired downlink power level pattern is different from a downlink power level pattern of a neighboring cell of the CoMP set,
   when the MS performs the CoMP operation based on the information of the CoMP set, transmitting a selected precoding matrix index (PMI) to the serving cell, the selected PMI act as a weakest interference or a strongest interference for the neighboring cell of the CoMP set performing the CoMP operation to the serving cell.

10. The MS according to claim 9, wherein the four frequency partitions include at least one boosted frequency partition and at least one non-boosted frequency partition.

* * * * *